United States Patent [19]
Dunn

[11] 3,921,748
[45] Nov. 25, 1975

[54] VEHICLE POWER STEERING ELECTRIC CIRCUIT

[75] Inventor: Donnell L. Dunn, Terre Haute, Ind.

[73] Assignee: J. I. Case Company, Racine, Wis.

[22] Filed: Oct. 24, 1974

[21] Appl. No.: 517,424

[52] U.S. Cl............. 180/79.2 R; 60/405; 417/3
[51] Int. Cl.²...................................... B62D 5/06
[58] Field of Search ....... 180/79.2 R; 60/405; 417/3

[56] References Cited
UNITED STATES PATENTS

| | | | |
|---|---|---|---|
| 3,001,540 | 9/1961 | Barnickel et al............... | 60/405 X |
| 3,083,533 | 4/1963 | Schenkelberger.......... | 180/79.2 R X |
| 3,590,689 | 6/1971 | Brewer............................ | 60/405 X |
| 3,762,492 | 10/1973 | Ron.................................. | 180/79.2 R |
| 3,820,620 | 6/1974 | Miller et al. ................... | 180/79.2 R |
| 3,847,243 | 11/1974 | Barth............................... | 180/79.2 R |

Primary Examiner—Leo Friaglia
Assistant Examiner—J. A. Pekar
Attorney, Agent, or Firm—Arthur J. Hansmann

[57] ABSTRACT

A power steering electric circuit having a hydraulic circuit and a flow-switch in the circuit and being electrically responsive to the flow of fluid in the hydraulic circuit. Two relay switches are electrically connected with the flow switch and are set in open and closed positions, according to the fluid flow through the flow-switch, and a third relay switch is included in the electric circuit and is connected with an electric motor for driving a hydraulic pump. Also, the ignition switch of the vehicle is connected with the electric circuit, all for the purpose of energizing the electric motor when the vehicle engine is not running, and thereby provide hydraulic power for the power steering unit of the vehicle.

3 Claims, 3 Drawing Figures

VEHICLE POWER STEERING ELECTRIC CIRCUIT

This invention relates to a vehicle power steering electric circuit which is energized when the hydraulic power steering unit of the vehicle is not operating, such as when the engine stops, and thus the electric circuit of this invention provides an emergency system for providing hydraulic fluid and emergency power steering for the vehicle.

BACKGROUND OF THE INVENTION

It is common practice in the prior art to provide power steering units for vehicles, and these units are commonly hydraulically powered such that the vehicle engine will operate a hydraulic pump for supplying the hydraulic pressure to the power steering unit. However, when the engine stops, such as in the instance of unintentional failure or stalling, then the conventional drive to the power steering unit is also interrupted and there is a consequent loss of power for the power steering unit. Such conditions are hazardous and otherwise undesirable.

It is a primary object of this invention to provide an auxiliary system for supplying power to the power steering unit even when the engine is not operating. As such, the object of this invention is to provide an emergency power steering system. More particularly, it is an object of this invention to provide an emergency power steering system which is automatically sensitive and operative with respect to the running of the vehicle engine, such that, immediately upon inadvertent or unintentional cessation of engine operation, the power steering system of this invention becomes operative and provides the necessary drive for the power steering unit of the vehicle.

Still further, it is an object of this invention to accomplish the aforementioned features of providing the emergency power steering arrangement and to do so with a system which does not draw electric power, or any other power, from the vehicle battery or engine when the engine is being started, but the system is ready for immediate use after the engine has been started.

It is a further object of this invention to accomplish the aforementioned objective and to do so with an emergency power steering system which can be operated each time the engine is intentionally shut down, such as when a diesel engine operating a tractor vehicle is shut down, but while the ignition switch is still on. In accomplishing this object, the auxiliary or emergency system of this invention can be checked and tested in a natural and convenient manner each time the engine is operated.

In summary, the emergency power steering system of this invention is automatically operative and is operative immediately upon the engine being shut down or accidentally stalled, but during the time that the ignition switch is still on, and the system of this invention does not draw power from the vehicle battery when the engine is being started.

Other objects and advantages have become apparent upon reading the following description in light of the accompanying drawings.

DETAILED DESCRIPTION OF THE PREFERRED EMBODIMENT

Figure 1:
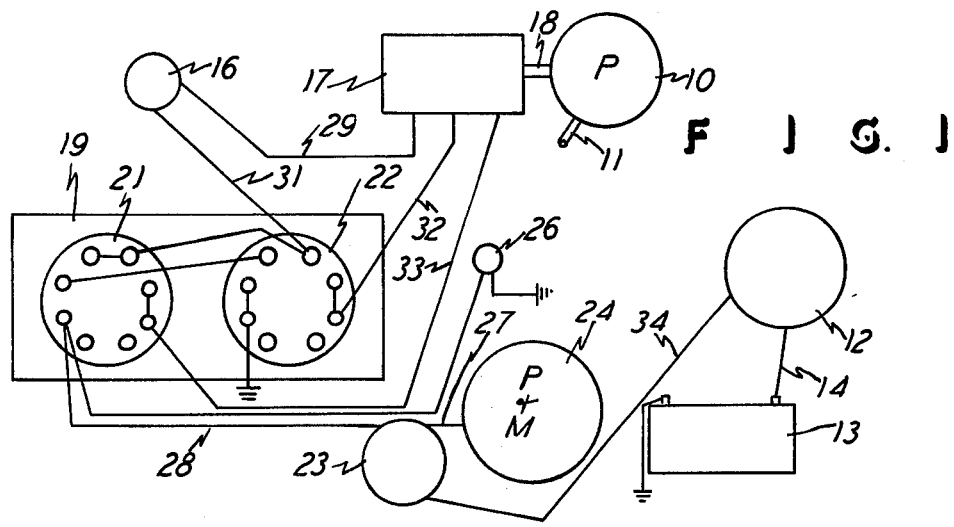
FIG. 1 is a showing of the components constituting an embodiment of this invention.

As mentioned at the outset herein, the invention pertains to an emergency power steering system which is interconnected with the standard and conventional system in a vehicle wherein the power steering hydraulic pump is driven by the vehicle engine. The vehicle may be a tractor powered by a diesel engine having a hydraulic pump and having a hydraulic steering unit which is supplied with hydraulic fluid from the pump, all in a conventional arrangement. FIG. 1 shows a hydraulic pump 10 having a hydraulic line 11 connected therewith, and this may be the conventional pump and line of a vehicle having these two well-known and conventional components. Further, FIG. 1 shows a standard or conventional engine starter 12 which is powered by a conventional battery 13 through an electric cable 14, and a conventional ignition switch 16 is also shown in FIG. 1.

FIG. 1 further shows the electric components utilized in this invention, and an electric flow-switch 17 is shown connected to the pump 10 by means of a hydraulic line 18. The flow-switch 17 is of a conventional and well-known construction, and, it will be seen and understood by one skilled in the art that the flow-switch 17 receives hydraulic fluid, through the line 18, and the switch therefore senses the flow of hydraulic fluid, or the lack thereof, and the switch 17 also has an electric switch section which responds to the presence or diminishing or absence of hydraulic fluid in the switch 17. A further disclosure of this switch is to state that the switch 17 is one such as that manufactured by Gems Division of DeLaval, Corporation of Farmington, Connecticut under its part No. 27055. Thus, the switch 17 is of a conventional construction which receives hydraulic fluid and which senses the hydraulic fluid and reacts through the electric switch section of the member 17 in a manner hereinafter described with connection with FIGS. 2 and 3.

FIG. 1 further shows an electric relay system which includes the unit 19 having a first relay switch 21 and an additional or second relay switch 22 and having a third relay switch 23, which may be in the form of a solenoid. Additionally, an electric motor and hydraulic pump combination 24 and an indicator electric bulb 26 are shown in the system in FIG. 1, with the bulb 26 connected to the relay 21, and the pump and motor 24 are connected to the solenoid 23, such as by means of the electric line 27, and the solenoid 23 is connected to the relay 21 by means of the electric line 28. Further, the ignition switch 16 and the flow-switch 17 are connected in series by the electric line 29, and the ignition switch 16 and the relay unit 19 are connected by the electric line 31, and electric lines 32 and 33 connect the flow-switch 17 with the relay switches 22 and 21, respectively. Also, electric line 34 connects the solenoid 23 with the starter 12.

With the arrangement shown in FIG. 1, it will now be understood that the pump 10 is hydraulically connected with the switch 17 which therefore senses the flow of hydraulic fluid from the pump 10. Additionally, when the pump 10 is not producing adequate hydraulic flow, this is sensed by the switch 17 which in turn affects the setting of the relay switches 21 and 22 which again in turn affect the connection of the battery 13 relative to the pump and motor combination 24. Therefore, when the pump 10, which is driven by the vehicle engine, such as a diesel engine of a tractor, is no longer producing adequate hydraulic flow, the electric system of this invention senses the reduction of hydraulic flow and electrically connects the battery 13 with the auxiliary electric motor and hydraulic pump unit 24 to thereby supply hydraulic flow to the vehicle conventional power steering unit. Therefore, this invention provides an emergency type of power steering system which is operative separate and apart from the operation of the vehicle engine.

Figure 2:
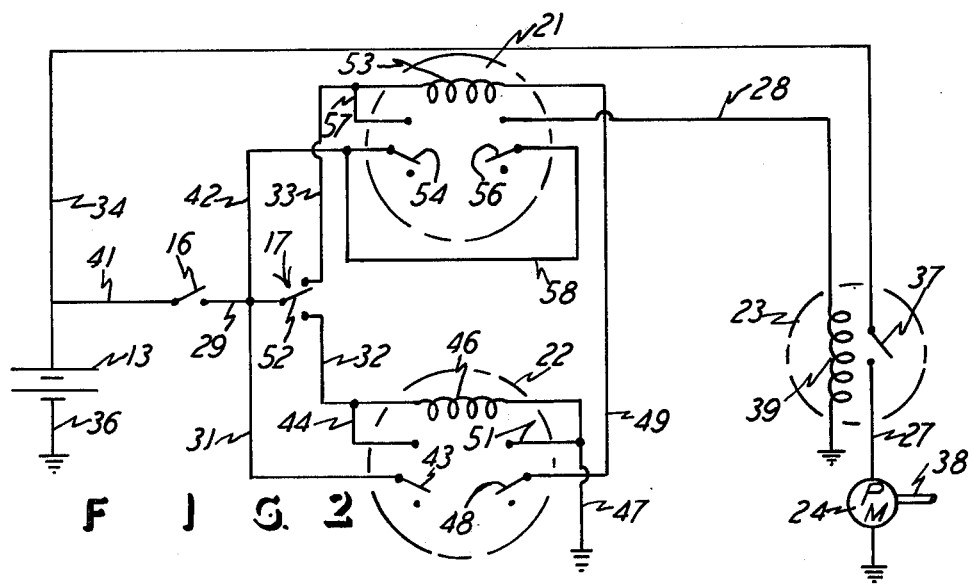
FIG. 2 is a schematic view of the electric components shown in FIG. 1.
Figure 3:
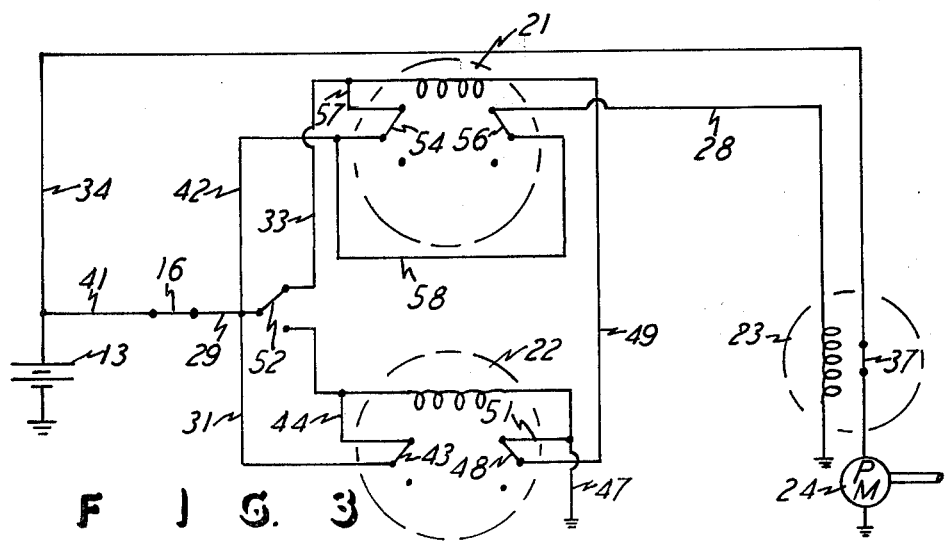
FIG. 3 is a view similar to FIG. 2, but showing the switches in one closed position.

FIGS. 2 and 3 show the electric schematic arrangement of the components shown in FIG. 1, and the same reference numerals are used throughout the drawings for describing the same components. Thus it will be seen that the vehicle conventional battery 13 is grounded through electric cable 36 and is connected with the relay 23 through the electric wire 34, such as shown in FIG. 2. The relay 23 may be of a conventional solenoid type, and it has an electric connector 37, in the form of a switch wiper arm which electrically connects the wire 34 with the wire 27 to power the electric motor component of the motor and pump combination 24. Thus, electrically closing the switch 37 connects the battery 13 with the unit 24 which thereby operates to pump hydraulic fluid in a hydraulic line 38 which connects between the unit 24 and the conventional hydraulic steering unit in the vehicle, to thereby supply the hydraulic steering unit with the necessary fluid for the emergency operation being described herein. Therefore, the relay 23 has the usual coil 39 which is controlled by the relays 21 and 22, which in turn are controlled by the flow-switch 17, all for connecting the battery 13 to the unit 24.

The remainder of the electrical system includes a wire 41 which connects between the battery 13 and the ignition switch 16 which in turn connects with the wire 31 and a wire 42 extending respectively to the relays 22 and 21. Relay 22 has a switch which is identified by a connector or wiper arm 43, having one side of the switch connected with the wire 31 and the other side thereof connected with a wire 44 which in turn connects with the wire 32. Relay 22 also has an electric coil 46, connected with the wire 32, and a wire 47 is connected with the coil 46 and extends to the ground connection, as shown. Also, relay 22 has a switch which is identified by a connector or wiper arm 48, one side of the switch 48 being connected with a wire 49, and the other side of the switch 48 being connected with a wire 51. Thus, the two switches in the relay 22 can of course make and break electric contact between the wires 31 and 44 and the wires 49 and 51, respectively, through the respective connectors 43 and 48 in the conventional schematic shown in FIG. 2. Also, the flow-switch 17 has an electric connector or wiper arm 52 which alternately connects between the wires 32 and 33, in the manner shown. The wires 33 and 49 have an electric coil 53 connected therewith and located in the relay 21. The relay 21 also has a switch identified by the electric connector or wiper arm 54, and it has another switch identified by the electric connector or wiper arm 56. Also, a wire 57 is in the relay 21, and thus the switch with the connector 54 can make and break the connection between the wires 42 and 57. A wire or connection 58 extends between the connectors 54 and 56, and thus the connector 56 can make and break electric connection between the wires 58 and 28, and the wire 58 is connected with the wire 42, as shown.

The aforementioned is the disclosure of the components of the electric system, and the following description will further disclose the system and will do so by reference to the function of the system. When the ignition switch 16 is closed, voltage is supplied from the battery 13 to the flow switch connector 52, and it is also supplied to the connector 54. Prior to the time that the conventional power steering system is operating in the vehicle, that is, before there is hydraulic fluid flowing in the system, the flow-switch 17 is in the normally closed position where the connector 52 is connected with the wire 33. However, at that time, the electric circuit is not complete because the relay 21, and specifically the coil 53 thereof, is not grounded, and therefore the electric circuit is not completed at that time.

Next, when the hydraulic system has fluid flowing therein through the operation of the vehicle's engine, the flow-switch 17 senses the flow of hydraulic fluid and the flow-switch connector 52 automatically changes to the normally open position which makes connection with the wire 32. At that time, coil 46 is energized, and thus connector 48 is automatically moved to connect with wire 51 and thus create the necessary ground connection for the relay 21, through wires 49, 51, and 47. At the same time, the relay switch having the connector 43 makes connection with the wire 44, and, switch connector 43 stays in the position of connecting with wire 44 now regardless of the position of the flow-switch connector 52, because of the arrangement and system shown with the ignition switch 16 closed and with the wires 31, 32, 44, and ground connection 47.

Therefore, to this point, the vehicle power steering system is operating, but the electrical emergency system of this invention is not yet operative, since it is not needed at this point, and the switch of relay 21 is not making connection with the final relay 23.

However, when the vehicle conventional power steering system reduces or loses its hydraulic flow, such as by a stalling of the engine, or for other reasons, then the flow-switch 17 senses that loss of flow and its connector 52 moves to connect with the line 33 which thereby energizes the coil 53 and causes the switch connectors 54 and 56 to move upwardly into a normally open position by making connection with the wires 57 and 28, respectively. This action of the flow-switch 17 therefore completes the electric circuits in the switches 21 and 22 and energizes the relay 23 to close the switch having the connector 37 and to thereby energize the electric motor and the hydraulic pump unit 24, all for supplying the desired emergency hydraulic power.

Also, regardless of the position of the flow-switch connector 52 at that point, that is, regardless of the hydraulic flow through the switch 17, the switches 54 and 56 remain in their normally open position of making the respective connection with the wires 57 and 28, and thus the emergency system is in the operative position after it is once established in that position, as described above. That is, there is electric connection from the battery 13 and through the ignition switch 16 and the wires 42 and 58 and 28 to the coil 39, all for keeping the switch connector 37 in the closed position for adequate flow of hydraulic fluid under the conditions described above.

FIG. 3 shows the position of the several switches when the emergency system of this invention is in the operative position described above. Thus the switches in the relays 21 and 22 are in the normally open position as shown in FIG. 3, and those switches are such that they are in a normally closed position when they are in the position shown in FIG. 2, and the flow-switch 17 is in the normally closed position in FIG. 3, and it is in the normally open position when the connector 52 is in connection with wire 32.

Once the system is in the condition of FIG. 3, it remains in that condition until the ignition switch 16 is opened, and thus it has the desired emergency feature described. Also, the system does not draw electric power while the engine is being started, since both the ignition switch 16 and the flow-switch 17 must be in the downward position for their respective connectors 16 and 52, and connector 52 would be in its downward or normally open position only after hydraulic flow has been established and that in turn positions relay connector 43 in its normally open position in connecting with wire 44 to establish the completed or grounded circuit for relay 21, as described. However, the system is then ready for immediate use after the engine has been started and the flow-switch 17 is positioned with its connector 52 in connection with the wire 32.

The system can be normally run for short periods of time for check-out and lubrication each time the diesel engine of that type of system is shut down, by the conventional diesel shut-off switch or button, and before the turning off of the ignition switch 16.

In summary, the system of this invention senses the loss of primary steering hydraulic power, and it turns on an auxiliary electrically-driven pump. The system employs a relay logic to provide the proper sequence of events to turn on the auxiliary system, and that sequence is that the ignition switch 16 is first closed, and the system ultimately senses the hydraulic flow, and it next senses the loss of hydraulic flow and it then energizes the auxiliary electric motor and hydraulic pump combination 24.

What is claimed is:

1. An electric circuit for a vehicle having a battery and a power steering system which includes a hydraulic pump and a hydraulic line, comprising an electric flow-switch connected with said hydraulic line and being of the type responsive to the flow of hydraulic fluid through said switch and including a movable electric connector positionable in electrically normally closed and open positions according to flow and a lack of flow of hydraulic fluid through said flow-switch, an additional electric switch electrically connected in series with said flow-switch and said battery for connecting and disconnecting said flow-switch relative to said battery, an electric motor and a second hydraulic pump combination, an electric relay system electrically connected with said electric motor and with said flow-switch and being automatically responsive to the said positions of said electric connector for electrically energizingly connecting and disconnecting said electric motor with said battery, said electric relay system including three relay switches with each thereof having an electric coil and electric connectors which are set in electrically normally open and closed positions in response to electric current in each said coil, the said coils of two of said relay switches being electrically connected to respective electric sides of said electric flow-switch to be alternately electrically connected with said additional switch according to flow of fluid through said flow-switch, the said electric connectors of said two relay switches being electrically connected to said additional electric switch, the said two relay switches being electrically connected together and with one thereof being grounded and forming an electric ground for said two relay switches and the other thereof being electrically connected to said coil of the third one of said relay switches, said connectors of said third one of said relay switches being electrically connected to said electric motor and said battery and being arranged to be electrically closed when its said coil is electrically energized, to thereby energize said electric motor from said battery.

2. The electric circuit as claimed in claim 1, wherein said additional electric switch is an ignition switch for said vehicle.

3. The electric circuit as claimed in claim 1, wherein the grounded one of said two relay switches is electrically connected to the normally open side of said flow-switch, and said other of said relay switches being electrically connected to the normally closed side of said flow-switch for electrically connecting said coil of said other relay switch with said additional switch when the fluid flow in said flow-switch is only a minimum, to thereby electrically connect said third relay switch with said battery.

* * * * *